United States Patent [19]  
Aquino et al.

[11] Patent Number: 4,938,336  
[45] Date of Patent: * Jul. 3, 1990

[54] SELECTIVE EJECTION CONVEYOR

[75] Inventors: Agostino Aquino, Paterson; Nicholas Polifroni, Cliffside Park, both of N.J.

[73] Assignee: Nabisco Brands, Inc., East Hanover, N.J.

[*] Notice: The portion of the term of this patent subsequent to Mar. 7, 2006 has been disclaimed.

[21] Appl. No.: 256,868

[22] Filed: Oct. 12, 1988

Related U.S. Application Data

[63] Continuation of Ser. No. 772,398, Sep. 4, 1985, Pat. No. 4,809,842.

[51] Int. Cl.$^5$ ............................................. B65G 47/46
[52] U.S. Cl. ........................................ 198/369; 198/444
[58] Field of Search ............... 198/362, 365, 366, 369, 198/372, 444; 209/656, 657, 698, 941, 705

[56] References Cited

U.S. PATENT DOCUMENTS

| 828,296 | 8/1906 | Baldwin. |
|---|---|---|
| 1,762,772 | 6/1930 | Fisher. |
| 2,497,874 | 2/1950 | Evans ............................. 198/369 X |
| 2,675,118 | 4/1954 | Morrison. |
| 3,003,249 | 10/1961 | Templeton ....................... 198/817 X |
| 3,279,587 | 10/1966 | Gray et al. ...................... 198/817 X |
| 3,354,613 | 11/1967 | Anderson. |
| 3,404,775 | 11/1968 | McClellan. |
| 3,429,416 | 2/1969 | Provost. |
| 3,429,417 | 2/1969 | De Good ............................ 198/837 |
| 3,640,372 | 2/1986 | Sarring. |
| 3,659,710 | 5/1972 | Tice ................................. 209/698 X |
| 3,983,988 | 11/1976 | Maxted ............................ 198/365 |
| 4,003,462 | 1/1977 | Perrott ............................. 198/369 |
| 4,011,935 | 3/1977 | Massey ........................... 198/369 X |
| 4,130,193 | 12/1978 | Bourgeois. |
| 4,166,525 | 9/1979 | Bruno. |
| 4,348,277 | 9/1982 | Cowlin et al. ................... 209/705 |
| 4,410,091 | 10/1983 | Cowlin et al. ................ 209/705 X |
| 4,424,966 | 1/1984 | Chandhoke. |
| 4,426,074 | 1/1984 | Fischer. |
| 4,499,988 | 2/1985 | Gasser. |
| 4,553,658 | 11/1985 | Gasser ............................. 198/369 |
| 4,561,545 | 12/1985 | Carlow ........................... 209/705 X |
| 4,585,227 | 4/1986 | Muller ........................... 198/369 X |
| 4,598,814 | 7/1986 | Felder ............................. 198/369 |
| 4,598,815 | 7/1986 | Adama ............................. 198/372 |
| 4,733,768 | 3/1988 | Aquino et al. ................... 198/369 |
| 4,756,399 | 7/1988 | Scata .............................. 209/698 X |
| 4,809,842 | 3/1989 | Aquino et al. ................ 198/444 X |

FOREIGN PATENT DOCUMENTS

| 1246546 | 8/1967 | Fed. Rep. of Germany ...... 198/494 |
|---|---|---|
| 2108023 | 8/1972 | Fed. Rep. of Germany. |
| 2518776 | 11/1976 | Fed. Rep. of Germany ...... 198/841 |
| 2803223 | 7/1978 | Fed. Rep. of Germany. |
| 2831323 | 1/1980 | Fed. Rep. of Germany. |
| 3310479 | 11/1983 | Fed. Rep. of Germany. |
| 2481959 | 11/1981 | France. |
| 0031211 | 2/1984 | Japan ............................. 198/365 |
| 0039618 | 3/1984 | Japan ............................. 198/369 |
| 0114214 | 7/1984 | Japan ............................. 198/365 |
| 1257753 | 12/1971 | United Kingdom. |

Primary Examiner—Robert J. Spar  
Assistant Examiner—D. Glenn Dayoan

[57] ABSTRACT

The invention is a selective diverting device for diverting an individual cookie from one conveyor belt path to another location. It is preferably used in combination with a sensing device, such as a weigher, optical sensor, color sensor, or the like, the sensor selecting out "rejected" articles and actuating the diverting member. The diverting member itself comes in three embodiments, all similar, and a fourth embodiment which is somewhat different. The first three embodiments include a pivotable conveyor-belt device which is automatically actuated (as by a piston or the like) to pivot out of the main conveyor belt path when a "reject" article is located thereon. In the fourth embodiment, the "reject" conveyor belt is a retractable device, not pivotable, and is for articles having a greater length than the spacing between two rollers (since relatively large gaps occur in this embodiment).

31 Claims, 3 Drawing Sheets

SELECTIVE EJECTION CONVEYOR

CROSS REFERENCE TO RELATED APPLICATIONS

This application is a continuation of Ser. No. 772,398 filed Sept. 4, 1985, and is related to the subject matter of Ser. No. 804,437 filed Dec. 4, 1985, now U.S. Pat. No. 4,733,768 which is a continuation-in-part of Ser. No. 772,398.

BACKGROUND OF THE INVENTION

The invention relates to ejection devices for use in a production line.

This invention may be used with conveyors having a plurality of rows of articles and especially food articles.

It is well-known to use pivoting numbers in connection with conveyor belts. The Prior Art pivoting members for use with conveyor belts cannot be used with multiple rows which are closely spaced, without suffering sufficient downtime loses do to breaking of an individual one of the conveyor belts. Maintenance of and replacement of a single individual conveyor belt on a pivoting section in the Prior Art would require removal of the entire drive shaft, making necessary extensive disassembly and re-assembly operations where the individual belt is for example between other conveyor belts rather than on the end. This lack of accessability, in a practical sense, limits the number of rows of articles which can be handled by such a pivoting conveyor system. Also, since the Prior Art pivoting conveyor members are difficult to maintain when a belt breaks, they may be undesirable for use in a high production system where there is only limited storage for articles coming off the conveyor belts, and which articles cannot be processed during the maintenance time. Furthermore, the Prior Art pivoting conveyor belts do not provide for rapid replacement of an integral belt, but would require use of a spliced belt which is stretched around the rollers and then joined in place. Such spliced belts do not last as long as integral belts which have been formed as a continuous band.

The U.S. Pat. No. 3,404,775 to McClellan shows in FIG. 2 a linearly-movable arm 22 which causes pivoting of an arm 18 which in turn causes pivoting of a conveyor belt 25. Pivoting causes dropping of a brick between two adjacent conveyor belts, as seen in FIGS. 2 and 3. It is noteworthy from an inspection of FIGS. 3 and 4 that two different pivoting conveyor belt sections must be pivoted in order for a brick 51 to drop. This is a result of the parallel adjacent members 56, 58 and 60, 62, as well as members 57 and 59 which are adjacent to members 61 and 65. These pivoting conveyor belt segments can be actuated by electrical, pneumatic, or other signals to drop selected bricks upon crosswise-moving belts to classify bricks according to color, finish, or other characteristics. However, this patent does not teach or suggest mounting a plurality of closely-spaced conveyor belt members for selective pivoting (or other movement) out of a conveyor belt path to permit dropping of selected articles, wherein the closely-spaced conveyor belts are driven in such a manner as to render any single one of the closely-spaced conveyor belts replaceable with a continuous band conveyor belt rather than a spliced conveyor belt.

The U.S. Pat. No. 4,426,074 to Fisher teaches a pivoting conveyor belt segment having an actuator 14, for clearing spoiled items from an overlapped stream of paper products. A three-flight conveyor belt transporting system is rocked bodily, so as to have an upper and a lower position, so that a continuous stream of spoiled items can be transferred downwardly under the next flight to a separate delivery. FIGS. 1 and 2 are illustrative, and show a sensor 17 such as a photoelectric cell together with a processing unit 18 capable of actuating a solenoid of valve 15, so as to drive cylinder 14. However, there is not teaching or suggestion of a plurality of commonly-driven conveyor belt segments which are selectively movable out of a conveying relationship and which are so connected with a drive means that any single belt can be replaced with a continuous belt without removing any other parts.

The U.S. Pat. No. 4,424,966 to Chandhoke teaches a cylinder 144 which causes pivoting of a conveyor belt segment 32 between rolls 46 and 54, between an upper conveying and a lower position. When the conveyor belt 32 is in the lower position, a member 134, 136, which is a rake, forms a bridge between the pulleys 46 and the T-shaped member 98 to support the books from the binder 12 on the upstream portion 30 of the conveyor 20. The articles so supported by the rake are thus in place ready to move the conveyor end portion 32 returns to its horizontal position. However, there is no teaching of a plurality of commonly-driven conveyor belt segments which are selectively movable out of a conveying relationship and which are so connected with a drive means that any single belt can be changed without removing any other parts, thereby permitting the use of continuous belts.

Other patents showing related type of conveying diverting devices are shown in U.S. Pat. Nos. 4,166,525; 3,640,372; 4,499,988; 4,130,193; 3,354,613; 1,762,772; 828,296; and 2,675,118.

SUMMARY OF THE INVENTION

The invention is a selective diverting device for diverting an individual cookie from one conveyor belt path to another location. It is preferably used in combination with a sensing device, such as a weigher, optical sensor, color sensor, or the like, the sensor selecting out "rejected" cookies and actuating the diverting member.

The diverting member itself comes in three embodiments, all similar, and a fourth embodiment which is somewhat different. The first three embodiments include a pivotable conveyor-belt device which is automatically actuated (as by a piston or the like) to pivot out of the main conveyor belt path when a "reject" article is located thereon. In the fourth embodiment, the "reject" conveyor belt is a retractable device, not pivotable, and is for articles having a greater length than the spacing between two rollers (since relatively large gaps occur in this embodiment).

In a separate aspect of this invention, due to the need for a plurality of narrow diverting belts to operate on cookies from a single large conveyor belt, a drive means is used which forms a separate aspect of the invention to be searched. In this aspect of the invention a single long drive shaft has multiple gears, each gear engaging a driven gear on the diverting belts. This arrangement is necessary so that continuous, rather than spliced, conveyor belts can be stretched into place for maintenance and repair operations. Thus, there is a clearance between the drive shaft and the nearest portion of the conveyor belt, so that a new conveyor belt can be snapped over the rollers for replacement at any time, without removal of any of the other diverting belt parts.

In one embodiment of the present invention, a pneumatic cylinder is selectively actuatable to cause pivoting of a support member about the drive shaft. A drive shaft has a drive gear which is in driving relation to a driven gear, the driven gear being operatively attached to a roller for a belt. Other rollers are provided, as well as a tensioning roller for maintaining tension in the belt. Each of the other rollers completing the conveyor belt circuit are rotatably mounted upon the support plate. An end of the pneumatic cylinder is pivotably connected to the support member, and the other end of the pneumatic cylinder is pivotably connected to a fixed support. The end of the driven cylinder which supports the belt is open, as are the other rollers which support the belt, so that a conveyor belt can be removed or placed over the rollers without disassembly of any of the rollers or other parts. Thus, a continuous conveyor band such as a nylon belt, can be used for prolonging a period between required belt changes due to worn or broken bands. A new continuous belt can be used to replace a broken belt without disassembly of any other parts.

The diverting member is placed in bridging relationship between two conveyors belts, each conveyor belt having multiple rows and columns of articles thereon. In response to a sensed attribute of the articles such as overweight or underweight, color of the article, or sensed information regarding the shape and composition of the article, among other measurable attributes, an individual article can be ejected by pivoting motion of the selective diverting device away from the bridging relationship, so that the selected article passes in between the two stationary conveyor belts, whereupon the diverting member is returned to its bringing relationship.

In another embodiment of the invention, a tensioning roller is omitted, and instead of flat conveyor belts, round conveyor members having circular cross-sectional shapes, are used.

In another embodiment, the support member is not mounted about the drive shaft, but rather a slotted guide member is used which is fixed to a stationary support. In this embodiment, the bridging portion of the conveyor belt is an end of the conveyor belt which is curved about an end roller. The support plate rotatably supports the end roller as well as the driven roller, the support plate having a follower member attached thereto for following the slot of the slotted member. Another plate can be used to pivotably fix the drive roller to the driven roller during pivoting motion thereof. An actuating member such as a pneumatic cylinder can be used to position the end roller either in bridging relationship or in non-bridging relationship between two stationary conveyor belts. The actuating member causing linear movement of the support member and the driving gear attached about the drive shaft remains in contact with the driven gear throughout. A small amount of angular motion of the support plate occurs due to the motion of the driven gear relative to the drive gear. The conveyor belt support rollers, namely the end roller and the driven roller, are rotatably mounted to the suport member such that the conveyor belt can be removed and replaced without disassembly of any other parts.

A computer or signal processor can be used in combination with any known type of sensor appropriate for the articles conveyed, in order to selectively actuate any one or ones of the diverting members to permit diversion of individual selected articles.

DETAILED DESCRIPTION OF THE INVENTION

Figure 1:
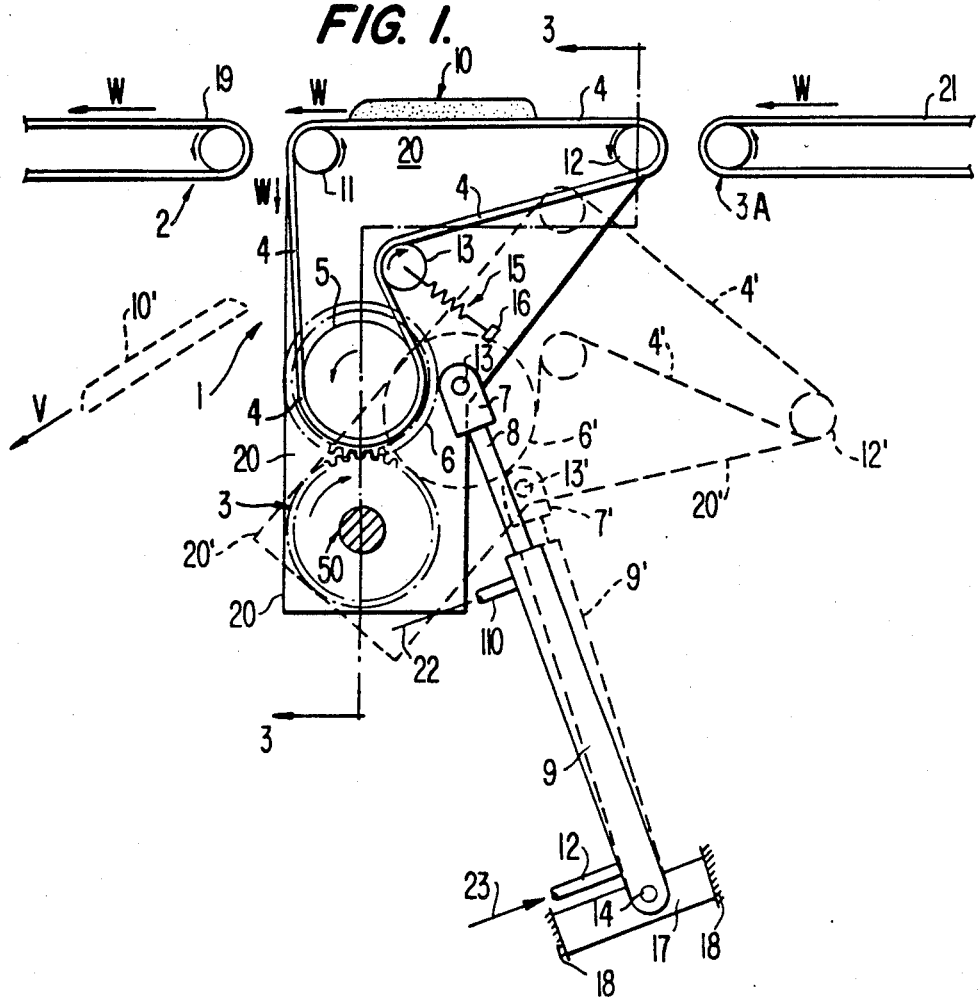
FIG. 1 shows a front elevational view of a diverting member used in the present invention.

FIG. 1 shows the front elevational view of a diverting member 1. The diverting member 1 includes a support plate 20. The support plate 20 is closely rotatably mounted about a drive shaft 50. The support plate 20 is pivotally connected by a pin 13 to a collar 7. The collar 7 is supported by a shaft 8 and an air cylinder 9.

The air cylinder 9 in the preferred embodiment is a Clippard peumatically-driven cylinder UDR-12 having a ¾ inch bore and a 2-inch stroke. The air cylinder 9 is preferably double acting so as to provide a positive force for moving the shaft 8 in both directions. The air cylinder 9 is pinned at its lower end by a pin 14 to a support member 17 connected to a fixed support 18 represented schematically in FIG. 1. The air cyclinder 9 has an upper air inlet 110 and a lower air inlet 12. Air flow is indicated schematically by arrow 22 and arrow 23 for respective inlets 110 and 12.

The diverting member 1 is in bridging relationship between a downstream conveyor belt 2 and an upstream conveyor belt 3A. The conveyor belt 2 has a belt 19, and the conveyor belt 3A has a belt 21. Both of the belts 19, 21 move with a speed W as indicated by the arrows in FIG. 1; however, it is contemplated as being within the scope of the present invention that the conveyor belts 19 and 21 may move differing speeds, which differing speeds can be used to adjust the spacing between articles. It is also contemplated as being within the scope of the present invention that the conveyor belt 4 can move at different speeds than the belts 19 and 21, if desired. As seen in FIG. 1, an article 10, such as candy bar or other article, has passed from conveyor belt 21 and onto a conveyor belt 4 which is part of the diverting member 1.

The conveyor belt 4 is supported by a roller 11 and a roller 12, both of which are rotatably mounted for rotation about each respective roller axis, upon the plate 20. Additionally, a tensioning roller 13 is slidably and rotatably mounted for contact with the belt 4 by a spring member 15 which is fixably connected at its other end to a support block 16. The support 16 in turn is fixed to the pipe 20. The tensioning roller 13 is not necessary and omission of a tensioning roller from any embodiment shown, or inclusion with any embodiment, is contemplated as being within the scope of the present invention.

A gear 6 is rotatably fixed about its axis to the plate 20, and is fixedly connected against relative rotation to a driven roller 5. Any alternative means of connection can also be used, such as reduction gearing, or other connecting means between the gear 6 and the roller 5. A drive gear 3 is in contact with the driven gear 6, the drive gear 3 being fixedly connected as by a pin, welding, or the like to a drive shaft 50. Thus, the drive gear 3 rotates relative to the plate 20 but gear 3 is fixed to the shaft 50 for rotation therewith.

While an air cylinder has been described in the preferred embodiment, any actuating device can be used instead, such as a solenoid, a magnetically-actuated device, or a mechanical device, or any other device capable of moving the device 1 between two positions. The air supply to either the top or the bottom air cylinder 9 is supplied from an air supply. Flow into or out of the port 110 and 12 is preferably valved by a solenoid-actuated valve or the like. An air cylinder 9 has been chosen in the preferred embodiment for maintainability and reliability, however any other actuating devices can be used in the present invention.

Further, while a plate 20 is shown, any support structure can be used instead, including curved, prismatic, or other shapes; and any forming means can be used for the member 20 or alternatives thereof, including but not limited to molding, casting, cutting, metalworking, or other forming means.

The support plate 20 is preferably made of strong, light-weight material such as aluminum, but it can also be made of steel, plastic, wood, or any other material sufficiently strong to support rollers and a conveyor belt. The rollers are preferably any conventional roller formed of wood, plastic, steel, aluminum, or the like and are mounted for rotation by bearing members. Such bearing members may include, for example, a low-friction material such as nylon or Teflon, ball bearings, journal bearings, or any other type of bearing known to those skilled in the bearing art. The belt 4 is preferably a flat urethane endless belt, such as those well-known in the art. However, any type of belt and belt material, including woven cloth, plastic, rubber, steel mesh or the like can be used with the present invention. Furthermore, while endless belts are preferred in the present invention for greater reliability and longer life, seamed belts can be used as well. Such seamed belts are usually made by splicing or by similar operations, and are generally inherently weaker and have a shorter life than endless belts which have no seams.

FIG. 1 shows the second position of the diverting member 1 in dotted outline The gears 3 and 6 have meshing teeth (the teeth or omitted from the drawings for clarity). As seen by the dotted outline the gear 6 pivots to its position indicated by 6', which remains in toothed, engaging contact with the gear 3. The gear 3 does not rotate with the plate but rather with the shaft. Therefore, the roller 5 remains in driving relationship with the gear 6 throughout the pivoting operation. When the diverting member 1 is in its second, diverting position as indicated in dotted line, a subsequent article 10' passes between the conveyors 2 and 3A as indicated by the position shown in dotted outline in FIG. 1. The article 10' is indicated as having a velocity V, which is a combination of a forward velocity W and a downward component of velocity due to gravity.

The diverted article can fall downwardly into any type of receptace. Furthermore, the diverted article 10' can fall upon a chute, another conveyor belt, or a shredder, among other devices, for further processing. All such further steps are contemplated as being within the scope of the present invention.

The diverting member 1 remains in its initial position shown in solid outline in FIG. 1 until a signal is received to divert an article 10', whereupon a diverting member 1 is moved to its second position as shown in dotted outline. After the article has been diverted, the air cylinder 9 is actuated to return the diverting member 1 to its first position as shown in solid outline.

Figure 2:
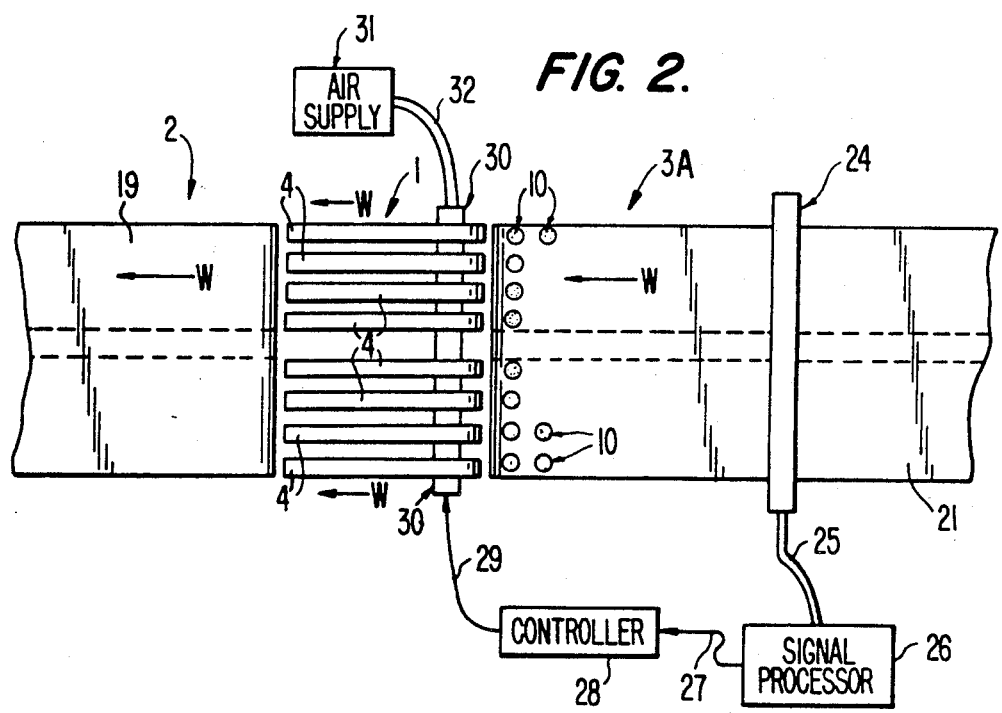
FIG. 2 is a top elevational view of the diverting device according to the present invention.

FIG. 2 is a top elevational view of the diverting member 1, and the conveyor belts 2 and 3A. Schematically indicated in FIG. 2 is a sensing device 24 for sensing each of the individual ones of the articles 10, and a signal processor 26 for processing signals received from the sensor 24. A controller 28 is also schematically indicated, for controlling a mechanism 30 which selectively actuates any one or ones of the air cylinders 9 to act upon respective diverting members 1. Also indicated schematically is an air supply 31 for supplying air to the air cylinders 9. Any air supply source, such as a storage tank, compresser, or the like can be used in the present invention.

The conveyor belts 2 and 3A, as well as the diverting members 1, are shown as being broken way in dotted outline along a longitudinal centerline. The broken away portion indicates that an arbitrary number of additional members or additional width of conveyor belt can be used, as appropriate. Also, a lesser number of rows and a lesser number of diverting members, as well as a lesser width of conveyor belt, can be used. All such variations are contemplated as being within the scope of the present invention. In the preferred embodiment, twenty four diverting members are arranged to be driven simultaneously by a single shaft 50. Each diverting members 1 receives articles from a single row of articles from the conveyor belt 21. When an article 10 to be diverted is sensed by the sensing member 24, the signal processor 26, having received signals along the pathway 25, determines the appropriate time for actuating a diverting device 1, and also selects one of the diverting devices 1 to be actuated. More than one diverting member 1 can be actuated selectively simultaneously, depending upon the articles 10 arriving at the diverting devices 1. The signal processor 26 takes into account the belt speed W of the belt 21, the position of the sensed article 10 which is to be diverted, and computes the desire to time at which the particular diverting device 1 is to be actuated.

The signal processor 26 in the preferred embodiment is a computer. Instructions are preferably programmed into the computer, which preferably compares the sensed information about the articles 10 with predetermined "acceptable" range for the particular attribute sensed. For example, if color is sensed, a particular degree of browning, or a particular shade of color may be optimum, but there is ordinarily an acceptable range of browning, or of colors, such that outside the range, articles 10 are to be rejected. Additional sensors can also be employed, for example, weight, shape, composition, etc., which sensors also would send signals to the signal processor 26. Thus, any number of sensing devices can be used, such as an ultrasonic thickness measuring device, an infrared scanner, a television camara, a salinity meter, a magnetic sensor, or the like can all be used. Thus, any number of sensing devices can be employed, the signal processor 26 accepting signals from all of the sensors and diverting articles 10 if the individual article 10 to be diverted fails to fall within the predetermined range of values sensed by the sensing devices 24.

The signal processor 26 can preferably include a vision processor for comparing image information received from imaging devices such as television cameras or the like, and comparing the images to a number of predetermined acceptable images, for determining whether or not to divert a particular article 10. The signal processor computes, based upon empirical data, theoretical equations, and other sensed imputs such as conveyor belt speeds of the belts 21 and 19, as well as any other conditions which are to be sensed, and sends its processed output signals (decisions) by pathway 27 to a controller 28.

Controller 28 can also be a computer, or it can be an analog controlled device. Furthermore the controller 28 can be a part of the signal processor 26 if desired. The controller 28 supplies signals and/or power to actuate individual ones of the diverting members 1 shown in FIG. 2. Such controllers are well-known in the art, and any controller for selectively actuating one of a plurality of actuatable devices can be used with the present invention. In the preferred embodiment, the controller supplies electrical power to solenoids which control air flow to the individual air inlets 110 and 12 of the cylinder 9.

While a preferred embodiment of actuator 9 controller 28 signal processor 26 and sensing devices 24 have been described and illustrated, the present invention is not limited thereto but encompasses any and all equivalent structures known to those skilled in the respective arts. The pathways 25, 27, and 29, as well as the air supply conduit 22, are schematically illustrated and would include any appropriate conduit for the device chosen. For example, the conduits 25, 27 and 29 are preferably electrical cables or cords where the sensing devices 24 have electrical ouputs and where the signal processor 26 and the controller 28 have electrical operating elements. For an analog control system, however, a fluidic computer might be used, or analog control elements could be used as well.

Figure 3:
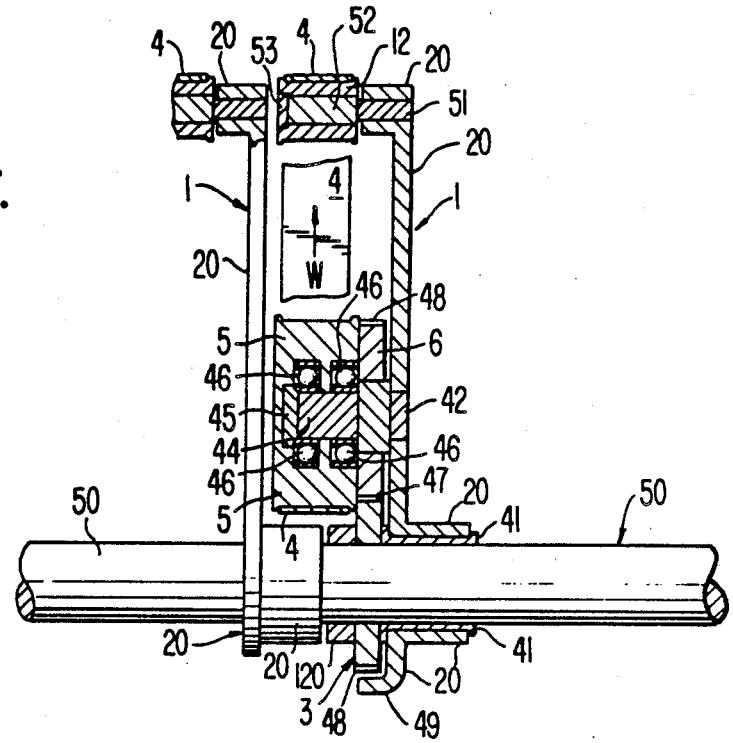
FIG. 3 is a side view, partially in section, along line 3—3 of FIG. 1, showing two diverting members arranged as used.

FIG. 3 is a sectional side view of a diverting member 1 taken along the line 3—3 of FIG. 1. Also shown to the left in FIG. 3, in side elevational view partially broken away at the upper portion, is another diverting member 1, showing the nesting relationship of the adjacent diverting member 1 and also showing the clearance between an end of a belt-carrying roller 5 and the support plate 20 of the adjacent diverting member 1. Also shown broken way at each end is the drive shaft 50 which drives each of the respective gears 6 of the respective diverting members 1.

As seen in FIG. 3, the plate 20 has a collar portion 20 disposed about the shaft 50. In the preferred embodiment, a low-friction member 41, such as a nylon sleeve or the like, is fixed in between the collar of the member 20 and the shaft 50 to permit relative rotation between the shaft 50 and the plate 20.

The plate 20 supports a shaft 51 which is fixed thereto, the shaft 51 rotatably supporting the roller 12. This is schematically indicated in FIG. 3, with a cross-section of the flat belt 4 being visable atop the roller 12 in FIG. 3. A portion of the belt 4, partially broken away at either end, is visible in FIG. 3 between roller 5 and 12. The roller 5 is mounted by bearings 46 to a shaft 44. An end member 45 retains the roller 5 in position along the shaft 44. A shaft 42 is connected to the shaft 44 as well as rotatably supporting the gear 6. The gear 6 meshes with the gear 3 which is pinned or welded to the shaft 50. Any means of attachment of the gear 3 may be used, such as keying, glueing, ultrasonic welding or the like, which are within the ambit of a skilled artisan.

The collar portion of the plate 20 serves to maintain the plate 20 against angular movement relative to the shaft except for rotational movement within a plane perpendicular to the axis of the shaft as indicated in FIG. 1. Thus, the plate 20 can rotate about the shaft 50 in a single plane between the two positions shown in FIG. 1 namely the solid position and a dotted-outline position.

The gear 3 is retained also by a collar 120 which prevents sliding movement along the shaft 50. There is a clearing between the top of the collar 120 and the belt 4 just above it as seen in FIG. 3. Thus, there is a clearance for replacing a belt 4, the clearance being between adjacent diverting members 1 as well as between the bottom of the roller 5 and the top of the collar portion of support member 20, as well as the top of the collar 120 as seen in FIG. 3. Thus, a belt can be placed around the rollers 11, 12, 13, and 5 without removal of any parts or elements of the diverting members 1, and does not require removal of the shaft 50. This is despite the very close spacing between adjacent diverting members 1 which is seen in FIG. 3. This close spacing of belts 4 atop the diverting members 1 is necessary where there are closely spaced articles arriving from the conveyor belt 21 (shown in FIG. 2).

The roller 12 is mounted in a similar manner to the rollers 11 and 13, which is shown in FIG. 3 as including a support shaft 52 which is rotatable relative to the roller 12, and a stop member 53 which retains the roller 12 on the shaft 52. The shaft 52 can be made of a low-friction material such as Teflon, nylon, or the like, or it may include ball bearings or other bearing surfaces such as a journal bearing.

Furthermore, the shaft 52 may be integral with the roller 12 and the shaft 51 then be made rotatable and journaled or otherwise made rotatable relative to the plate 20 within which it is received.

Figure 4:
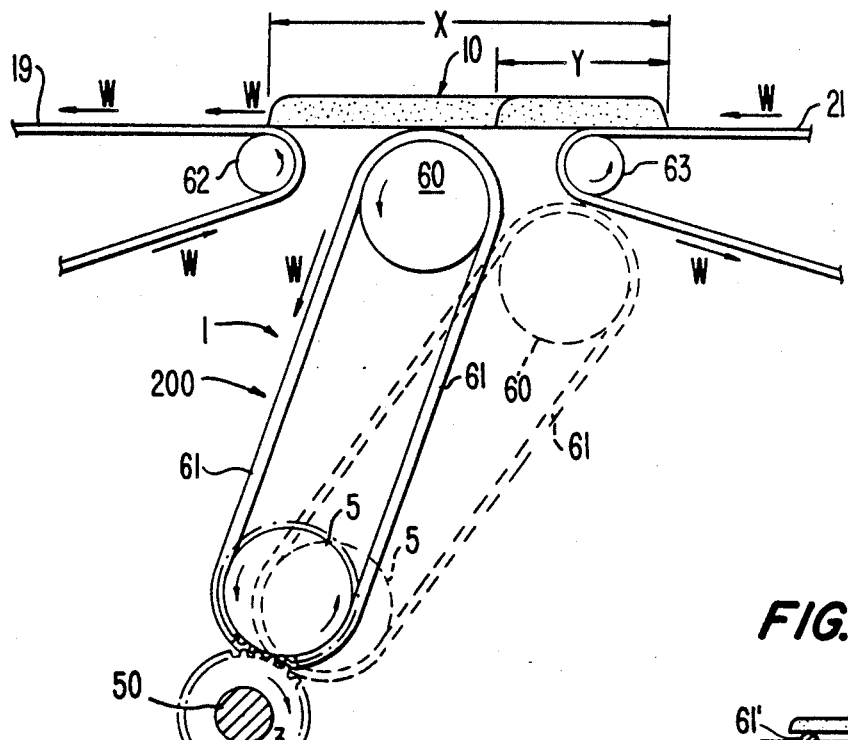
FIG. 4 is a front elevational view of an alternative embodiment of a diverting device.

FIG. 4 is a front elevational view of another embodiment of an alternative diverting member 200. The diverting member 200 would be supported by a similar support plate 20 (not shown in FIG. 4 for clarity) and be actuated by a similar actuator 9. However, rather than the surface of a belt 61 being used to bridge the gap betwenn adjacent conveyor belts 19 and 21, rather the curved end of a roller 60 having a belt thereacross is used. Here, no tensioning roller is used, although if desired a tensioning roller can be provided. In FIG. 4 there is seen an article 10 which is overlying the roller 63 and having a portion in the gap between the rollers 62 and 63. For this embodiment, the permissible range of articled sizes is indicated as follows. The smallest article has a length Y, and the longest article has a length X. Between the range of sizes (between the lengths X and Y), articles can be diverted by pivoting of the diverting member 200 to the position shown in dotted outline in FIG. 4. In the dotted outline position the diverting member 200 is no longer in bridging relationship, and the article 10 can fall in the gap between 62 and 63. When the article has been diverted, the diverting member 200 is returned to its bridging position shown in solid outline.

Figure 5:
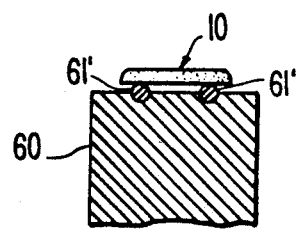
FIG. 5 is a side sectional view showing an alternative belt arrangement.

The belt 61 used with the diverting member 200 is preferably not a flat belt but rather a pair of round belts. FIG. 5 shows a cross-sectional view of the mounting of the round belts on roller 60. The round belts 60', 61' together support an article 10. Here, the article is preferrably an edible article such as a candy bar or a cookie or the like. However, any other article can be diverted by the diverting device 200, and the present invention is not limited to use with edible articles, candy bars, or cookies but encompasses all articles capable of being conveyed by any conveying means.

Figure 6:
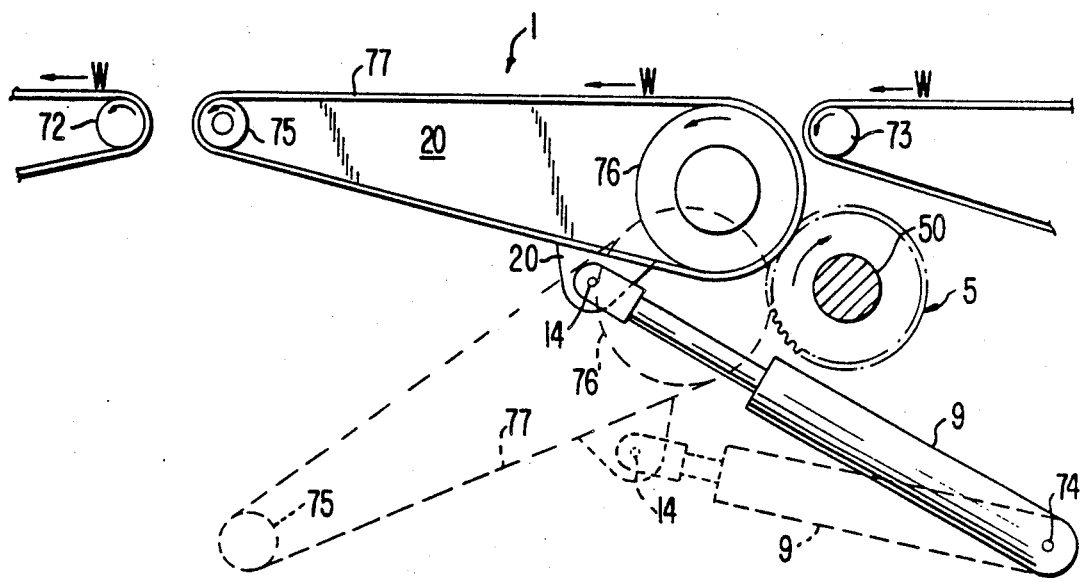
FIG. 6 is a front elevational view, partially in section, of another embodiment of the diverting member.

FIG. 6 is a front elevational view, partially in section, showing another embodiment of diverting member 1. Here also, a support plate 20 is used to maintain separation between rollers 75 and 76. A gear, hidden behind roller 76 but attached thereto for rotation therewith, is in engaging contact with gear 5 which is fixed for rotation with shaft 50. The shaft 50 is shown in section in FIG. 6, since the shaft 50 extends perpendicularly to the plane of the drawing for driving other diverting members. The diverting device 1 is in bridging relationship between a pair of rollers 72 and 73.

A pnuematic cylinder 9 is fixed to the plate 20, in pivoting relationship by a pin 14. The pneumatic cylinder 9 is also pinned at its other end by a pin 74, so that, upon change in the distance between 14 and 74, the diverting member 1 pivots to the position shown in dotted outline in FIG. 6, as does the position of the pneumatic cylinder 9. Thus, the belt 77 carried by the rollers 75 and 76 in FIG. 6, is in bridging relationship between the rollers 72 and 73. The belts associated with the respective rollers 72, 75 and 76, and 73 need not move at the same respective speeds, but rather each can have its own speed. A single selected speed W has been selected for convenience, where the spacing between the articles is not to be changed. However, with different belt speeds, the spacings between articles can be increased or decreased by appropriate adjustment of the speeds of the various conveying members.

The miscellaneous conventional elements such as bearings, and alike, can be those as shown in FIG. 3, or any other suitable bearing and other elements can be used, for example nylon bushings can be used for an anti-friction surface and the like. Again, the plate 20 extends about the shaft 50, so that it is relatively rotatable thereto. Also, the plate 20 portion passing about the shaft 50 is also relatively rotatable relative to the gear 5. Such arrangement can preferably be similar to that shown in FIG. 3, however any equivalant structure or alternatives which would be known to anyone having ordinary skill in the art, are contemplated as being within the scope of the present invention.

As seen in FIG. 6, in the solid-outline position the diverting member 1 is in bridging relationship and is capable of carrying articles from the conveyor belt supported by roller 73 and on to conveyor belt 77, once the articles pass to the conveyer belts supported by roller 72. In the dotted outline position of the diverting member 1, shown in FIG. 6, the diverting member 1 is no longer in bridging relationship between rollers 72 and 73, thereby permitting a selected article to pass between the rollers 72 and 73 and downward, rather than onto the conveyor belts supported by roller 72.

The pneumatic cylinder 9 is preferrably of the double acting type, having a positive forward thrust as positive reverse thrust, similar to the pneumatic cylinder shown in FIG. 1 which has an inlet passage 110 and an inlet passage 12 for passage of air. Also, as discussed with reference to the other embodiment, solenoids or other controls can be used to control the action of the cylinder 9, so as to control the position of the diverting member 1 between its solid-outline position and its dotted-outline position. Such solenoids are actuated either manually or by a controller 28 such is as shown in FIG. 2. However, any known control means for moving a diverting member from its solid-outline position to a dotted outline position is contemplated as being within the scope of the present invention. Such means might include electromagnetic, mechanical, pneumatic, manual, or the like actuating means.

Figure 7:
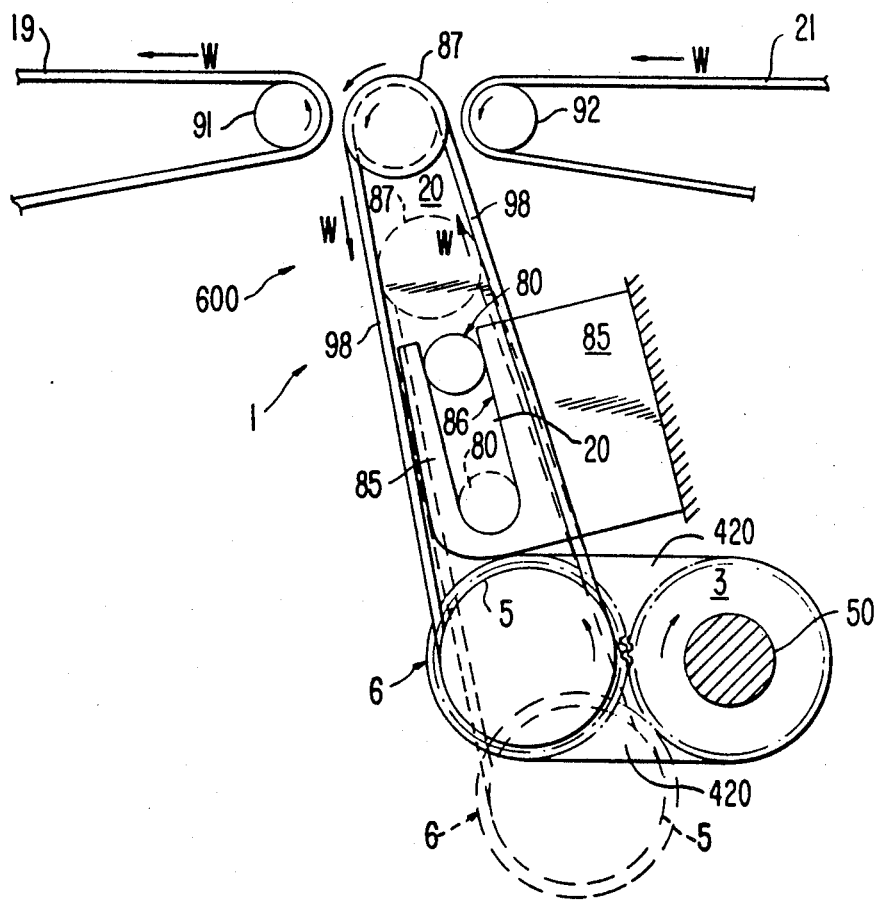
FIG. 7 is a front elevational view of another embodiment of the diverting member.

FIG. 7 is a front elevational view of an alternative embodiment of the diverting member according to the present invention. Here, the diverting 600 has a roller 87 and belt 98 which bridges a gap between rollers 91 and 92. The belt 98 is preferably similar to belt 61' having a round cross-section, with grooves being formed in the roller 87 for receiving a pair of such belts 98 similar to that shown in FIG. 5.

Here, due to space limitations and the close spacing of the rollers 91 and 92 to the roller 87, relatively small articles can be selectively diverted. This is possible due to the very small gaps between the roller 87 and the roller 92, as well as between the roller 87 and the roller 91. Due to this close tolerance, the roller 87 must be retracted substantially downwardly, rather than being pivoted through an arc. Here, the supporting structures are somewhat different from the previous embodiments, however a similar actuating means 9 can be used on either the support plate 20 or the auxiliary support plate 420 discussed hereunder.

The support plate 20 pivotably supports rollers 87 and 5. No belt slack take-up roller is provided, although use of such take-up roller together with any other rollers desired is contemplated as being within the scope of the present invention. Also, the support plate 20 is not extended to encompass and surround the shaft 50, but rather terminates without encircling the shaft 50. A follower 80, which may be a fixed or rotatable member which is attached to the plate 20, is made and adapted to follow a slot 86. The slot 86 is formed in a guide plate 85, the guide plate 85 being fixed to a support which is stationary with respect to the parts shown. This support is indicated schematically in FIG. 7.

As seen in FIG. 7, the slot 86 serves to guide the motion of the plate 20 as the follower descends to its lower most position indicated in dotted outline in FIG. 7, and returns to its upper most position shown in solid outline in FIG. 7. The dotted outline position of the roller 87 indicates that a gap is left between the rollers 91 and 92 to permit diverting of articles 10 passing from conveyor belt 21.

Another support plate 420 passes about the shaft 50 and is pivotally connect, as by pinning, or the like, to the plae 20 at a location which is colinear with the axis of the roller 5. Thus, the plate 420 is pivotable about the shaft 50, and is moveable relative to the gear 3, and is pivotable relative to the plate 20. Furthermore, the plate 420 is pivotable relative to the gear 6 and relative to the roller 5. Thus, the plate 420 serves only to retain the gear 6 in contact with the gear 3 during movement of the gear 6 to its dotted outline position shown in FIG. 7. An actuator, such as actuator 9 shown in FIG. 1, can be provided and attached either to the plate 20 or to the plate 420, since the linkage as shown including slot 86, plate 20 and plate 420, permit movement of the plate 20 and associated rollers from the solid outline position to the dotted outline position. The cylinder 9 can be pinned to a fixed support at one end and pinned for pivoting either to the plate 20 or to the plate 420 as desired, and such positioning of an actuating member such as the cylinder 9 would be a conventional design expedient known to any one having ordinary skill in the art.

While round belts have been discussed as compared with flat belts, the use of either flat belts or round belts is a matter of choice in the present invention. Any conveyor belts or means may be used, including V-belts, round belts, or flat belts, perforated belts, woven belts, chain-mesh belts, and the like. Furthermore, any belt materials can be used. Such materials include steel mesh, Teflon-coated materials, nylon, urethane, rubber, or the like.

Any control system can be used to actuate selectively the actuating members which are used in the present invention. Any and all actuating members capable of moving the diverting member 1 from one position to another are contemplated as being within the scope of the present invention. Furthermore, any selectively controllable control devices are contemplated as being within the scope of the present invention, and such control devices can be as discussed with respect to the signal processor 7, controller 28, and control device 30. Furthermore, any type of sensors can be used in determining which articles are to be diverted.

Articles useable with the present invention include any food products, including candy bars, cookies, cakes, pies, breads, as well as non-food articles such as bricks, pages, boxes, electrical circuits, or any other articles capable of being selectively diverted from one conveying means to another.

Also, although supply conveyor belts have been used for supplying articles to the diverting members shown in the present invention, other members can be used as well, such as a flat surface from which articles are pushed by articles behind the pushed articles, such as an accumulator station, as well as a chute wherein articles slide along the chutes to the diverting members, as well as any other supply means capable of supplying articles to the diverting members 1. The same is also true of the diverting member 600, namely that any supply member can be used and not just the conveyor 21 shown in FIG. 27. Furthermore, any other conveying means can be used to receive articles conveyed by the diverting while the diverting member is in its bridging position, and not just the conveyor belt 19 of the figures. For example, a flat accumulator tray can be used or a sloping chute can be used permitting accumulated articles to slide therealong if such is desired. These and any other conveying means and devices can be used for supplying articles to the diverting members and for carrying articles away.

The improved selective diverting devices of the present invention are capable of achieving the above-enumerated advantages and results, and while preferred embodiments of the present invention have been disclosed, it will be understood that it is not limited thereto but may be otherwise embodied within the scope of the following claims.

What is claimed is:

1. A diverting device for selectively diverting articles from a conveyor belt path to a second location, the diverting device including at least one diverting conveyor operatively connected to a drive shaft and movable from a first conveying position to a second conveying position to divert said articles, said diverting conveyor comprising;
   (a) a support member movable with respect to the drive shaft and having a drive roller operatively connected to the drive shaft and at least one idle roller rotatably mounted to the support member, wherein said support member is movable whereby said drive roller is movable in an arc coaxially with the drive shaft;
   (b) drive means to operatively connect the drive shaft to the drive roller;
   (c) a diverting conveyor belt operatively disposed on the drive roller and idle roller to define a diverting conveyor surface wherein the drive roller and idle roller are spaced from the drive shaft whereby the conveyor belt can be removed from the drive and idle rollers without disassembly of the diverting device;
   (d) actuator means to selectively move the support member in relation to the drive shaft from the first conveying position to the second conveying position.

2. The diverting device of claim 1 wherein the drive roller and idle roller are substantially parallel to the drive shaft.

3. The diverting device of claim 1 wherein the drive roller and idle roller extend substantially perpendicular to the plane of the support member.

4. The diverting device of claim 1 wherein the drive means comprises a first drive gear on said drive shaft operatively connected to a complementary second drive gear connected to the drive roller.

5. The diverting device of claim 4 wherein the second drive gear is integral with the drive roller.

6. The diverting device of claim 1 wherein the movable support member is substantially rectilinearly reciprocable along an axis essentially orthogonal to the axis of the drive shaft.

7. The diverting device of claim 6 further comprising a guide means to guide the support member along said axis.

8. The diverting device of claim 7 further comprising a linkage arm having a first end pivotally connected to said support member and a second end pivotally connected about said drive shaft.

9. The diverting device of claim 8 wherein said first end of the linkage arm is pivotable coaxially with the drive roller whereby said drive roller is a fixed distance from the drive shaft.

10. The diverting device of claim 1 wherein the actuator means is a pneumatic cylinder assembly.

11. The diverting device of claim 10 wherein said pneumatic cylinder assembly includes a double-acting pneumatic cylinder having a fixed end and an extendable end attached to the support member and being selectively actuable from an extended position wherein said diverting conveyor is in the first conveying position to a retracted position wherein the diverting conveyor is in the second conveying position.

12. The diverting device of claim 1 comprising a plurality of said diverting conveyors, said diverting conveyors being spaced apart a distance whereby said diverting conveyor belt can be removed from the drive roller and idle roller without disassembly of the diverting device or severing the belt.

13. The diverting device of claim 12 wherein each of said diverting conveyors are selectively movable from said first and second conveying positions.

14. The diverting device of claim 1 further comprising a sensing means to detect a preselected characteristic of an article being conveyed in the conveyor belt path and to produce a first signal corresponding to said characteristic; a signal processor to receive said first signal and to produce a second signal, and; a controller means to receive said second signal and actuate the actuator means to move said diverting conveyor from said first to said second conveying positions.

15. The diverting device of claim 12 further comprising a sensing means to detect a preselected characteristic of an article being conveyed in the conveyor belt path and to produce a first signal corresponding to said characteristic, a signal processor to receive said first signal and to produce a second signal, and a control means to receive said second signal and selectively actuate the actuator means of one or more of the diverting conveyors.

16. A diverting device for selectively diverting articles from a conveyor belt path to a second location comprising a drive shaft and at least one diverting conveyor reciprocable from a first conveying position to a second conveying position, the diverting conveyor comprising;
   (a) a support member substantially rectilinearly reciprocable along an axis substantially orthogonal to the drive shaft and conveyor belt path;
   (b) a drive roller and at least one idle roller rotatably mounted on the support member, and a linkage arm having a first end pivotally connected to the drive shaft and a second end pivotally connected to the support member whereby said drive roller is movable radially about the drive shaft;
   (c) at least one diverting conveyor belt operatively disposed on the drive roller and idle roller to define a diverting conveyor surface,
   (d) drive means operatively connecting the drive shaft with the drive roller,
   (e) actuating means to reciprocate the diverting conveyor from the first conveying position to the second conveying position.

17. The diverting device of claim 16 wherein said drive roller is spaced from the drive shaft a distance sufficient to allow removal of the conveyor belt without disassembly of the diverting device.

18. The diverting device of claim 16 wherein said drive roller and idle roller extend substantially perpendicular to the plane of the support member.

19. The diverting device of claim 16 wherein the second end of the linkage arm is pivotal about an axis coaxially disposed to the axis of rotation of the drive roller.

20. The diverting device of claim 16 wherein the diverting conveyor further includes guide means to effect the reciprocable movement of the support member.

21. The diverting device of claim 20 wherein the guide means includes a fixed bracket member having an elongated slot therein and a pin member fixed to the support member and received within the slot.

22. The diverting device of claim 16 wherein the diverting conveyor is disposed whereby the idle roller is positioned in the conveyor belt path when the diverting conveyor is in the first conveying position and is positioned substantially below the conveyor belt path when the diverting conveyor is in the second conveying position.

23. The diverting device of claim 16 wherein the actuator means is a pneumatic cylinder assembly.

24. The diverting device of claim 23 wherein said pneumatic cylinder assembly includes a double-acting pneumatic cylinder having a fixed end and an extendable end attached to the support member and being selectively actuable from an extended position wherein said diverting conveyor is in the first conveying position to a retracted position wherein the diverting conveyor is in the second conveying position.

25. The diverting device of claim 16 comprising a plurality of said diverting conveyors, said diverting conveyors being spaced apart a distance whereby said diverting conveyor belt can be removed from the drive roller and idle roller without disassembly of the diverting device or severing the belt.

26. The diverting device of claim 25 wherein each of said diverting conveyors are selectively movable from said first and second conveying positions.

27. The diverting device of claim 16 further comprising a sensing means to detect a preselected characteristic of an article being conveyed in the conveyor belt path and to produce a first signal corresponding to said characteristic; a signal processor to receive said first signal and to produce a diverting signal; and a controller means to receive said diverting signal and actuate the actuator means to reciprocate said diverting conveyor from said first to said second conveying position.

28. The diverting device of claim 25 further comprising a sensing means to detect a preselected characteristic of an article being conveyed in the conveyor belt path and to produce a first signal corresponding to said characteristic, a signal processor to receive said first signal and to produce a signal, and a control means to receive said second signal and selectively actuate the actuator means of one or more of the diverting conveyors.

29. The diverting device of claim 16 wherein said drive roller and idle roller include at least one annular groove and said diverting conveyor belt is received within said annular groove.

30. The diverting device of claim 29 wherein said diverting conveyor belt has an annular cross section complementary with said annular groove.

31. The diverting device of claim 29 wherein said drive roller and idle roller includes two annular grooves and wherein two complementary diverting conveyor belts are received within said annular grooves.

* * * * *